March 15, 1955 R. NEREM 2,704,088
LIQUID VENT VALVE FOR STORAGE CONTAINERS
Filed Nov. 8, 1950 2 Sheets-Sheet 1

INVENTOR
ROBERT NEREM
Hilmond O. Vogel
ATTY

March 15, 1955  R. NEREM  2,704,088
LIQUID VENT VALVE FOR STORAGE CONTAINERS
Filed Nov. 8, 1950  2 Sheets-Sheet 2
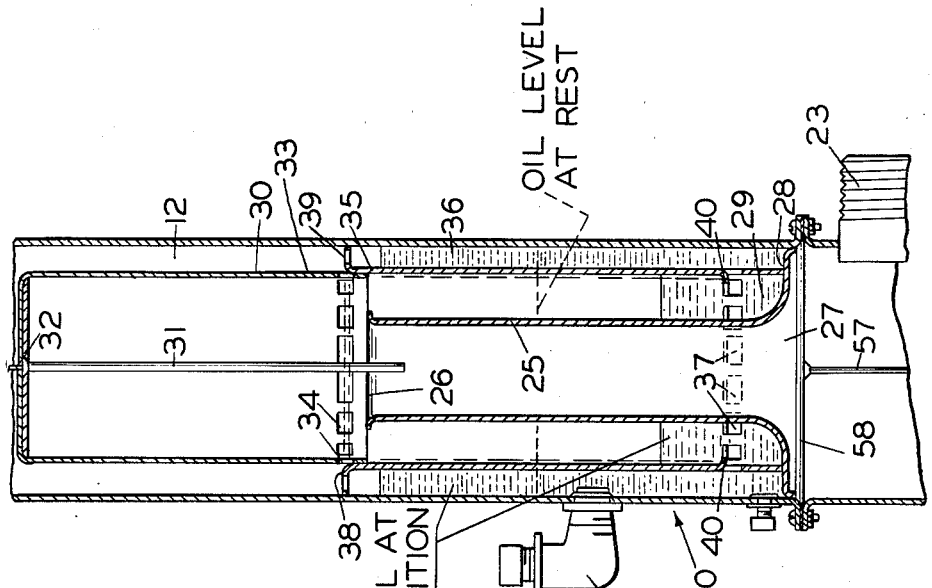
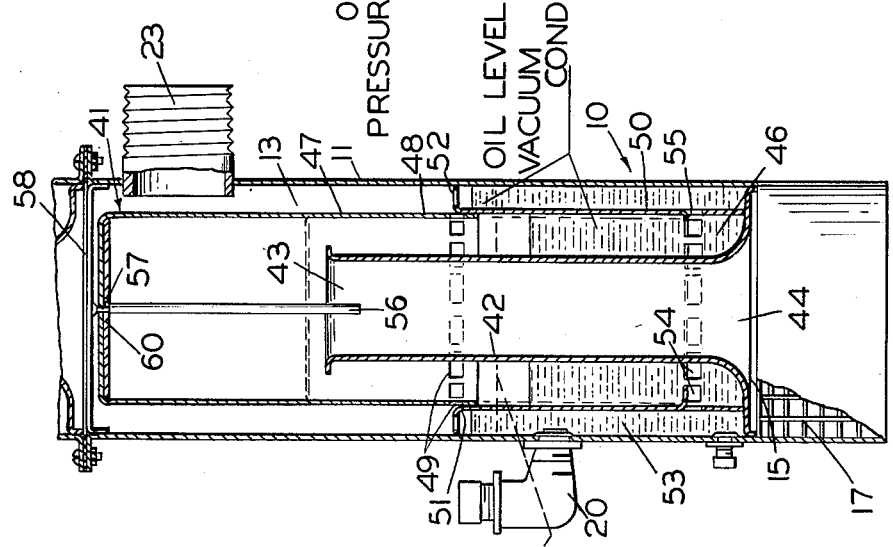
INVENTOR
ROBERT NEREM
ATT'Y United States Patent Office 2,704,088
Patented Mar. 15, 1955

2,704,088
LIQUID VENT VALVE FOR STORAGE CONTAINERS

Robert Nerem, Evanston, Ill.

Application November 8, 1950, Serial No. 194,690

8 Claims. (Cl. 137—248)

This invention relates to a liquid vent valve construction for storage containers.

In storage containers wherein certain liquids are stored it is necessary to provide venting devices for permitting the escape of gases when the pressure within the tank exceeds a predetermined pressure. This excess pressure may occur, for instance in tanks containing petroleum, when the tank is filled or when atmospheric conditions cause pressure changes within the tank. Likewise the tank may be subjected to a minus pressure when liquid is withdrawn and it is thus necessary to relieve the vacuum condition within the tank.

Various mechanical vents have been provided but these have generally proved impractical due to maintenance problems and other deficiencies which did not assure the positive and automatic action required for properly venting tanks containing volatile liquids.

The liquid seal was thus developed and a vent of this type is well illustrated in the Atwell Patent 1,585,276 patented May 18, 1926. A liquid vent as shown in this patent generally consists of a casing having upper and lower chambers, a vent construction being located in each chamber. Each vent construction is provided with a tubular member which is surrounded by a well of liquid. The tubular member may be placed into communication with either the atmosphere or with the interior of a tank to be vented. An inverted bell-shaped valve is seated over the tubular member, the valve having a lower open end immersed in the liquid thereby normally effecting a liquid seal between the atmosphere and the interior of the tank. Excessively high pressures within the tank will raise the valve to break the liquid seal to permit proper venting of the tank.

In vents of this type it has been found that under certain conditions the bell-shaped valve may not raise completely free of the liquid seal. In such cases the pressure is released by the gas bubbling through the liquid to the atmosphere. This action is undesirable since particles of the liquid are entrained in the vapors as they are released to the atmosphere and a consequent loss of the liquid seal results necessitating frequent maintenance and supervision.

It is a prime object of this invention therefore, to provide an improved liquid vent construction that provides an effective, positive and efficient liquid seal for storage tanks without the need of frequent maintenance and attention.

Another object is to provide a liquid vent construction having separate venting valves designed to vent a storage tank under a positive pressure or a vacuum.

A still further object is to provide a liquid vent construction comprising a casing having a tubular member disposed therein, the tubular member being surrounded by a well of liquid in which the lower end of an inverted bell-shaped valve is inserted to effect a liquid seal, the bell-shaped valve being encircled by a sleeve having its inner wall positioned in relatively close snug sliding relation with respect to the outer wall of the valve, this arrangement permitting the valve to rise without having a gradual decrease in the balancing liquid pressure column, and also greatly minimizing the chances of entrainment of the liquid in the seal due to excess gases bubbling through the liquid prior to the complete lifting of the valve free of the liquid.

These and further objects of the invention will become more readily apparent from a reading of the specification when examined in connection with the accompanying drawings:

In the drawings,

Figure 5 is a cross sectional view of a lower portion of a liquid vent, the view showing the vent in an operating condition to relieve vacuum conditions within a storage tank.

Figure 6 is a cross sectional view of an upper portion of a liquid vent, the view showing the vent in an operating condition for relieving the pressure within a storage tank.

Figure 1:
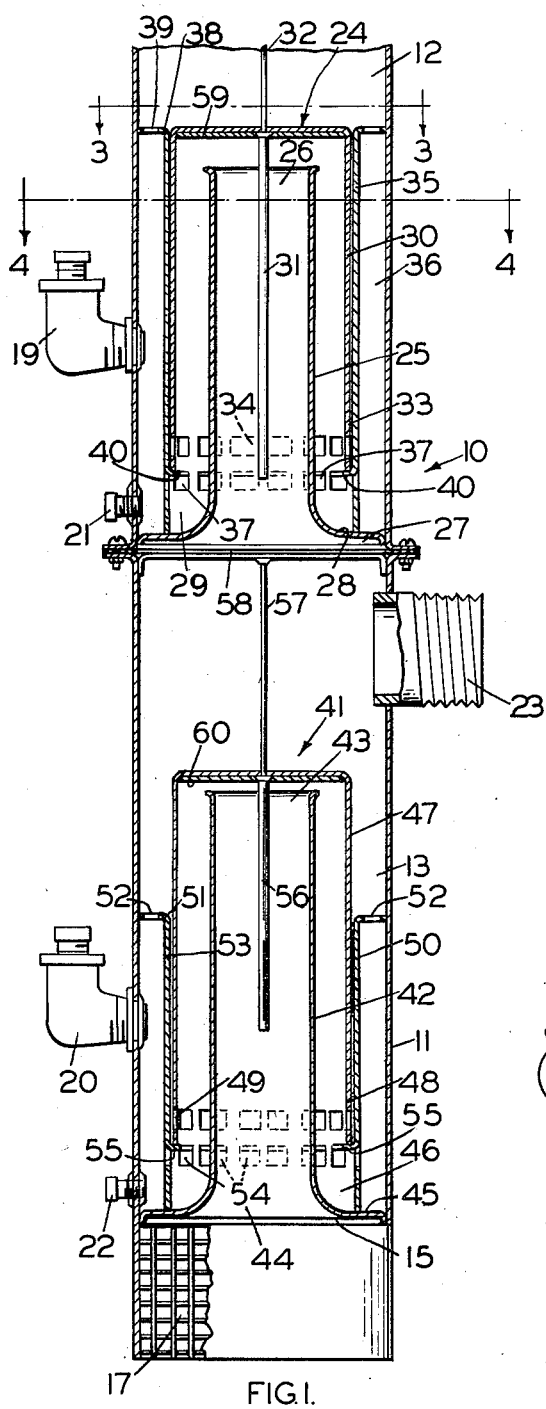
Figure 1 is a cross sectional view, in elevation, of a liquid vent construction embodying the principles and elements of the invention.
Figure 2:
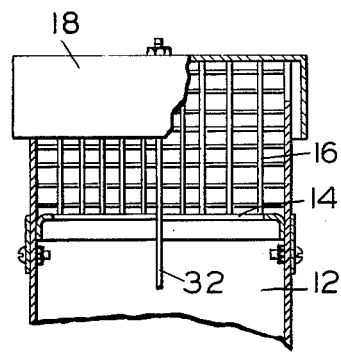
Figure 2 is a fragmentary sectional view of the upper end portion of the liquid vent shown in Figure 1.
Figure 3:
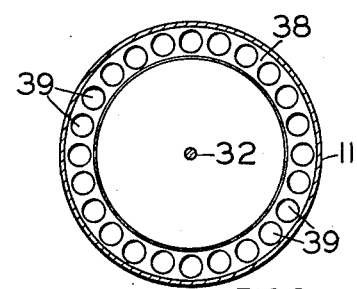
Figure 3, is a cross sectional view of the liquid vent taken along the line 3—3 of Figure 1.
Figure 4:
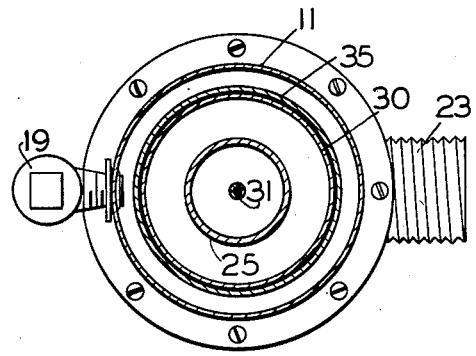
Figure 4, is a cross sectional view taken substantially along the line 4—4 of Figure 1.

Referring to the figures, a liquid vent construction is generally designated by the reference character 10. The vent construction 10 includes a container or casing 11 having upper and lower chambers 12 and 13 respectively. The casing 11 is provided at its upper end with an atmosphere opening 14 and at its lower end with an atmosphere opening 15. Conventional flame arrester 16 and 17 are respectively positioned in the openings 14 and 15. A weather cap 18 is positioned over the opening 14. The chambers 12 and 13 are respectively provided with filler plugs 19 and 20 and drain plugs 21 and 22. A conduit plug or nipple 23 is in communication with the interior of the casing 11, the nipple being adapted to connect to a storage tank (not shown) to be vented.

A pressure vent valve construction 24 is positioned in the upper chamber 12. The valve construction 24 comprises a tubular member 25 open at its upper and lower extremities as indicated at 26 and 27. The tubular member 25 is flared outwardly at its lower end as indicated at 28 to provide the bottom for a liquid containing well 29. A bell-shaped valve 30 is positioned over the tubular member 25 in an inverted position. The bell valve 30 is free to reciprocate vertically and has connected thereto a tubular guide 31 which is in telescoping engagement with a rod 32 securely connected at the upper end of the casing 11.

The bell-shaped valve 30 is provided with a skirt portion 33 having a plurality of circumferentially disposed openings 34 which normally are immersed in liquid within the well 29 to effect a liquid seal between the tubular member 25 and the atmosphere opening 14.

A cylindrically shaped elongated body or sleeve 35 encircles the valve 30. The sleeve 35 is spaced from the inner wall of the casing 11 to provide a vertically extending annular passageway 36. Circumferentially spaced openings 37 in the sleeve 35 provide for communication between the well 29 and the passageway 36. The sleeve 35 is provided with an annular lip 38 having circumferentially disposed ports or openings 39 which provide for communication between the passageway 36 and the atmosphere opening 14.

As indicated, the inner wall of the sleeve 35 is in close contiguous relation with respect to the outer wall of the valve 30. The proximity is such that the valve can reciprocate freely and yet a minimum of space between the walls of the sleeve and the valve is provided. The sleeve 35 has inwardly turned lip portions 40 which provide a seat for the bell-shaped valve 30.

A vacuum valve construction of similar design as the valve 24 is generally indicated by the reference character 41. A tubular sleeve 42 is open at its ends as indicated at 43 and 44, the open end 44 being in communication with the atmosphere opening 15. The lower end of the tubular member 42 is flared as indicated at 45 to provide a liquid well 46 surrounding the lower end of the tubular member.

A bell-shaped valve 47 is positioned over the tubular member 42 in an inverted position. The valve 47 includes a skirt portion 48 having a plurality of openings 49 normally submerged in the liquid well.

A cylindrically shaped elongated body or sleeve 50 surrounds the valve 47, the sleeve having its inner wall in contiguous or closely spaced relation with respect to the outer wall of the valve 47 so that the valve 47 may reciprocate freely with a minimum of space between the walls.

The sleeve 50 has an annular lip 51 having a plurality of ports or openings 52. The sleeve 50 is laterally spaced from the casing 11 to provide a vertical annular passageway 53 in communication with the conduit 23. The sleeve 50 is provided with openings 54 providing for communication between the well 46 and the passageway 53. The sleeve 50 further includes inwardly bent lip portions 55 providing a seat for the bell-shaped valve 47.

The valve 47 has a tubular guide member 56 connected thereto. The guide member 56 is in telescoping engagement with a guide rod 57 securely connected to a strap 58 extending across the casing 11. Both valves 30 and 47 are provided with weights 59 and 60 which may be added to or deleted from in order to fix the predetermined pressure at which the valves are to be effective.

In operation the liquid vent construction 10 is connected to a tank to be vented. The wells 29 and 46 are both filled with a liquid and the valves 30 and 47 in the position shown in Figure 1 have their respective skirt portions 33 and 48 immersed in liquid to effect a seal between the conduit 23 and the atmosphere openings 14 and 15.

As a storage tank normally breathes due to slight variations in pressure therein the valve 30 normally rises and recedes to alleviate pressure conditions. The valve 47 reacts similarly in conditions where the tank is under a vacuum.

Assuming now that a predetermined pressure is reached within a tank, the pressure against the valve 30 causes the valve to rise upwardly whereupon the skirt 33 is drawn out of the liquid well 29. The valve rises free of the liquid seal and the tubular member 25 is thereupon directly in communication with the atmosphere opening 14 through the openings 34, and pressure within the conduit 23 is relieved. The valve 30 is so weighted by the weight 59 that the valve 30 can assume the position shown in Figure 6 without the undesirable condition of having the gases under pressure escaping to the atmosphere by bubbling through the liquid seal, thus resulting in undesirable entrainment of the liquid. The close snug relationship of the sleeve 35 to the valve 30 assures that the valve will become completely withdrawn from the liquid in order to secure proper venting, this arrangement permitting the bell to rise without a gradual decrease in the balancing liquid pressure column of the liquid seal.

As shown in Figure 6 the valve 30 has been raised to its venting position and the position of the oil level with respect to the normal oil level condition is indicated. Thus it can be seen that complete withdrawal of the valve is assured so that the venting takes place, not through the liquid, but independently thereof. The valve is self lubricating since the liquid in the well may consist of an oil. If for any reason the valve would fail to rise, a safety feature is provided. The pressure under such an extraordinary condition would be relieved through the passage 36 and openings 39.

The upper valve 30 relieves pressure in the tank and the lower valve 47 relieves vacuum or minus pressure. As best shown in Figure 5, a predetermined vacuum condition in the conduit 23 causes the bell 47 to rise until the openings 49 are in direct communication with the tubular member 42 and the conduit 23 whereupon air enters into the tank through the opening 15.

The operation of valve 47 and valve 30 is similar in each case, the valves being completely withdrawn from the liquid in the wells to permit venting. Only in the event of emergency, such as might take place when a valve becomes inoperative, does the venting take place through the liquid seal itself. Thus also a safety measure is provided.

The objects of the invention have thus been fully achieved and an efficient and long enduring liquid vent valve has been provided. The valve will operate over long periods of time without replacement of or addition to the liquid seal since entrainment of the liquid with the vapor released, does not occur, except under an emergency condition. The novel sleeve construction of the valves assures this desired operation at all times.

It must be understood of course that the pressure and vacuum valves need not be enclosed in one casing as herein disclosed, but may be placed on a tank in separate containers or casings. Changes may be made in the design which do not depart from the spirit of the invention as disclosed, or the scope thereof as defined in the appended claims.

What is claimed is:

1. A liquid valve construction comprising a container having an opening in communication with the atmosphere, conduit means adapted to connect said container to a tank to be vented, a tubular connection within said container in communication with said conduit means, a liquid containing well surrounding said tubular connection, a bell-shaped valve disposed over said tubular connection in an inverted position, said valve normally having its open end in contact with the liquid within the well for providing a liquid seal between the tubular connection and the atmosphere, a cylindrical sleeve having an elongated solid wall throughout the major upper portion of its length and being open at its upper end, said cylindrical sleeve encircling a portion of said bell-shaped valve and having its inner wall positioned in substantially snug sliding relation with respect to the outer wall of said valve, the outer wall of said cylindrical sleeve being spaced from said container to provide an annular shaped passage, an annular shaped baffle positioned near the upper end of said cylindrical sleeve between the said sleeve and the container and having an opening therein to provide a continual communication between the annular shaped passage and the atmosphere opening, said cylindrical sleeve having a plurality of circumferentially spaced openings adjacent the bottom edge thereof, said valve being movable upwardly wherein the open end of said valve is moved to a position adjacent the upper open end of said cylindrical sleeve and said conduit, tubular connection and atmosphere opening are in direct communication.

2. A liquid valve construction comprising a container having an opening in communication with the atmosphere, conduit means adapted to connect said container to a tank to be vented, a tubular connection within said container in communication with the atmosphere opening of said container, a liquid containing well surrounding said tubular connection, a bell-shaped valve disposed over said tubular connection in an inverted position, said valve normally having its open end in contact with the liquid within the well for providing a liquid seal between the tubular connection and said conduit means, a cylindrical sleeve having an elongated solid wall throughout the major upper portion of its length and being open at its upper end, said cylindrical sleeve encircling a portion of said bell-shaped valve and having its inner wall positioned in substantially snug sliding relation with respect to the outer wall of said valve, the outer wall of said cylindrical sleeve being spaced from said container to provide an annular shaped passage, an annular shaped baffle positioned near the upper end of said cylindrical sleeve between the said sleeve and the container and having an opening therein to provide a continual communication between the annular shaped passage and said conduit means, said cylindrical sleeve having a plurality of circumferentially spaced openings adjacent the bottom thereof, said valve being movable upwardly wherein the open end of said valve is moved to a position adjacent the upper open end of said cylindrical sleeve and said conduit tubular connection and atmosphere opening are in direct communication.

3. A liquid vent valve construction comprising a container having an opening in communication with the atmosphere, conduit means adapted to connect said container to a tank to be vented, a chamber positioned in the upper portion of said container including means for continual communication with said atmosphere opening, a tubular connection within said container in communication with said conduit means, a liquid containing well surrounding said tubular connection, a bell-shaped valve disposed over said tubular connection in an inverted position, said valve normally having its open end in contact with the liquid within the well for providing a liquid seal between the tubular connection and the chamber, an open end sleeve having an elongated solid wall upper section open at its upper end and adapted to communicate with said chamber, the outer wall of said elongated section being spaced from said container to provide an annular shaped passage, an annular shaped baffle positioned near the upper end of said elongated section between the said elongated section and the container and having an opening therein to provide a continual communication between the annular shaped passage and the said chamber, said elongated section having a plurality of circumferentially spaced openings adjacent the bottom thereof, said elongated section encircling a portion of said bell-shaped valve and having its inner wall positioned in substantially snug sliding relation with respect to the outer wall of said valve, said valve being movable upwardly wherein the open end of said valve is moved to a position adjacent the upper end of said elongated section and said conduit, said chamber, said tubular connection and atmosphere opening are in direction communication.

4. A liquid vent valve construction comprising a container having an opening in communication with the atmosphere, conduit means adapted to connect said container to a tank to be vented, a chamber positioned in the upper portion of said container including means for continual communication with said conduit means, a tubular connection within said container in communication with said atmosphere opening, a liquid containing well surrounding said tubular connection, a bell-shaped valve disposed over said tubular connection in an inverted position, said valve normally having its open end in contact with the liquid within the well for providing a liquid seal between the tubular connection and the chamber, an open end sleeve having an elongated solid wall upper section open at its upper end and adapted to communicate with said chamber the outer wall of said elongated section being spaced from said container to provide an annular shaped passage, an annular shaped baffle positioned near the upper end of said elongated section between the said elongated section and the container and having an opening therein to provide a continual communication between the annular shaped passage and the said chamber, said elongated section having a plurality of circumferentially spaced openings adjacent the bottom thereof, said elongated section encircling a portion of said bell-shaped valve and having its inner wall positioned in substantially snug sliding relation with respect to the outer wall of said valve, said valve being movable upwardly wherein the open end of said valve is moved to a position adjacent the upper open end of said elongated section and said conduit, said chamber, said tubular connection and atmosphere opening are in direct communication.

5. A liquid vent valve construction comprising a container having an opening in communication with the atmosphere, conduit means adapted to connect said container to a tank to be vented, a tubular connection within said container in communication with said conduit means, a liquid containing well surrounding said tubular connection, a bell-shaped valve member disposed over said tubular connection in an inverted position, a sleeve member having an elongated cylindrical solid wall upper body section open at its upper end, said sleeve member encircling a portion of said bell-shaped valve member and having its inner wall positioned in substantially snug sliding relation with respect to the outer wall of said valve member, the outer wall of said sleeve member being spaced from said container having a port to provide an annular shaped passage communicating with said atmosphere opening, said sleeve member being provided with at least one opening adjacent the bottom thereof for communicating said annular passage and said valve said valve being movable upwardly wherein the open end of said valve is moved to a position adjacent the upper open end of said sleeve member and said conduit, tubular connection, annular passage and atmosphere opening are in direct communication.

6. A liquid vent in accordance with claim 5 wherein the bell-shaped valve member includes a skirt portion adjacent its open end, said skirt portion having a plurality of circumferentially spaced openings, the openings being movable with the bell-shaped member to the upward position to provide for communication of said tubular connection and said conduit with the said annular passage and said atmosphere opening.

7. A liquid vent valve construction comprising a container having an opening in communication with the atmosphere, conduit means adapted to connect said container to a tank to be vented, a tubular connection within said container in communication with said atmosphere opening, a liquid containing well surrounding said tubular connection, a bell-shaped valve member disposed over said tubular connection in an inverted position, a sleeve member having an elongated cylindrical solid wall upper body section open at its upper end, said sleeve member encircling a portion of said bell-shaped valve member and having its inner wall positioned in substantially snug sliding relation with respect to the outer wall of said valve member, the outer wall of said sleeve member being spaced from said container to provide an annular shaped passage having a port communicating with said conduit means, said sleeve member being provided with at least one opening adjacent the bottom thereof for communicating said annular passage and said valve, said valve being movable upwardly wherein the open end of sleeve member and said conduit, annular passage, tubular connection and atmosphere opening are in direct communication.

8. A liquid vent in accordance with claim 7 wherein the bell-shaped valve member includes a skirt portion adjacent its open end, said skirt portion having a plurality of circumferentially spaced openings, the openings being movable with the bell-shaped member to the upward position to provide for communication of said tubular connection and said atmosphere opening with the said annular passage and said conduit means.

References Cited in the file of this patent

UNITED STATES PATENTS

| | | |
|---|---|---|
| 1,028,044 | Mack | May 28, 1912 |
| 1,529,818 | Tuttle | Mar. 17, 1925 |
| 1,589,026 | Wilson | June 15, 1926 |

FOREIGN PATENTS

| | | |
|---|---|---|
| 502,434 | Great Britain | Mar. 17, 1939 |